United States Patent
Parhi et al.

(10) Patent No.: US 8,009,823 B2
(45) Date of Patent: Aug. 30, 2011

(54) SYSTEM AND METHOD FOR LOW-POWER ECHO AND NEXT CANCELLERS

(75) Inventors: Keshab K. Parhi, Maple Grove, MN (US); Yongru Gu, Lake Forest, CA (US)

(73) Assignee: Leanics Corporation, Maple Grove, MN (US)

( * ) Notice: Subject to any disclaimer, the term of this patent is extended or adjusted under 35 U.S.C. 154(b) by 1397 days.

(21) Appl. No.: 11/487,041

(22) Filed: Jul. 13, 2006

(65) Prior Publication Data

US 2010/0260245 A1    Oct. 14, 2010

Related U.S. Application Data

(60) Provisional application No. 60/704,318, filed on Aug. 1, 2005.

(51) Int. Cl.
 *H04M 1/00* (2006.01)
(52) U.S. Cl. ......... 379/390.02; 379/406.02; 379/406.08; 379/406.13; 375/242; 375/295
(58) Field of Classification Search ............. 379/406.01–406.16, 390.01–397
See application file for complete search history.

(56) References Cited

U.S. PATENT DOCUMENTS

| | | | | |
|---|---|---|---|---|
| 6,400,761 B1 * | 6/2002 | Smee et al. | ................. | 375/232 |
| 2002/0037031 A1 * | 3/2002 | Agazzi et al. | ................. | 375/220 |
| 2003/0086515 A1 * | 5/2003 | Trans et al. | ................. | 375/346 |
| 2003/0223505 A1 * | 12/2003 | Verbin et al. | ................. | 375/261 |
| 2006/0056521 A1 * | 3/2006 | Parhi et al. | ................. | 375/242 |

OTHER PUBLICATIONS

Y. Gu and K. K. Parhi, Pipelining Tomlinson-Harashima Precoders', in Proc. of 2005 IEEE International Symposium on Circuits and Systems, pp. 408-411, Kobe, Japan, May 2005.*

K. K. Parhi and D.G. Messerschmitt, "Pipeline interleaving and parallelism in recursive digital filters, Part I and Part II," IEEE Trans. Acoust., Speech, Signal Processing, pp. 1099-1135, Jul. 1989.*

* cited by examiner

*Primary Examiner* — Fan Tsang
*Assistant Examiner* — Ibraham Sharifzada

(57) ABSTRACT

A method to design low complexity and low power echo and NEXT cancellers based on wordlength reduction technique is presented. A circuit architecture to implement echo and cancellers is also presented. The low complexity and low power design relies on the fact that a TH precoder can be viewed as an IIR filter with an input equal to the sum of the original input to the TH precoder and a compensation signal. The proposed design also relies on the fact that sum of the original input to the TH precoder and the compensation signal has finite levels, which can be represented in less bits than the original input of the echo and NEXT cancellers. An improved design by exploiting the statistics of the compensation signal is also proposed to further bring down the complexity and power consumption of these cancellers.

22 Claims, 17 Drawing Sheets

$2^{-1}$ : one bit right shifter (a) Long cable case (b) Medium cable case (c) Short cable case
31

SYSTEM AND METHOD FOR LOW-POWER ECHO AND NEXT CANCELLERS

CROSS-REFERENCE TO RELATED APPLICATIONS

This application claims the benefit of U.S. Provisional Application No. 60/704,318, filed on Aug. 1, 2005, the entire content of which is incorporated herein by reference in its entirety.

STATEMENT REGARDING FEDERALLY-SPONSORED RESEARCH AND DEVELOPMENT

This invention was made with Government support under the SBIR Grant No. DMI-0441632, awarded by the National Science Foundation (NSF). The Government has certain rights in this invention.

FIELD OF THE INVENTION

The present invention relates to data processing, transmission, and digital communication. More specifically, it is related to low-power implementation of echo and NEXT (near-end crosstalk) cancellers for precoder based DSP transceivers.

BACKGROUND OF THE INVENTION

Many multiple wireline communication systems, such as DSL (digital subscribe line) systems and gigabit Ethernet systems suffer from echo and crosstalks. Echo and NEXT (near-end crosstalk) cancellers are widely used to counter the effect of echo and NEXT noise. In 10 Gigabit Ethernet over copper (10GBase-T) system, full duplex baseband transmission is performaned over four pairs of UTP (unshield twisted pair). Each received signal is corrupted by echo from its own transmitter and NEXT interferences from three adjacent transmitters. To meet the desired throughput and target BER ($10^{-12}$) requirements, echo and NEXT noise cancellation are expected to be about 55 dB and 40 dB, respectively.

The typical way to perform echo and NEXT noise cancellation is using finite impulse response (FIR) filters in digital domain, where the replica of the echo and NEXT estimated by the FIR filters is subtracted from the received noisy signals. This straightforward approach, however, will have a significant complexity if the size of the FIR filters is large and thus leads to large power and silicon area. In the 10GBase-T transceivers, 16 long FIR filters need to be implemented for noise cancellation. Due to the extreme high symbol rate (such as 800 Mega Baud required for 10Gbase-T) and high noise cancellation level requirement, each FIR-filter based canceller can be of several hundred taps, and the number of total taps is around 7000. Implementing those filters at such a high speed requires a significant amount of power. Therefore reducing the power consumption of these FIR filters is important for a successful DSP transceiver design.

How to design low power echo and NEXT cancellers for 10GBase-T transceivers is a challenging task. It is apparent in the industry that the FIR techniques used in 1000 BASE-T solutions, if implemented in a straightforward way, would result in a complexity increase on the order of 45× over 1000 BASE-T. The high degree of cancellation required at these speeds also makes all-analog cancellation difficult, since both high bandwidth and high power of adaptive analog filters are required if feasible. By using DFT transformation, approximate complexity saving can be 90% (See, e.g., Sanjay Kasturia and Jose Tellado, "Lower Complexity Architectures for Implementing 10GBT XTalk Cancellers and Equalizers FIRs", 10GBase-T Study Group Meeting, http://www.ieee802.org/3/10GBT/public/sep03/kasturia_1_0903.pdf, September 2003). However, new issues such as block processing latency, increased memory and increased precision, associated with this technique make it unacceptable for the 10GBase-T application. Because of the inherent time-varying and randomness of the channel impulse responses, simple techniques to extend the length of the impulse response cancelled, such as continuous-time analog filters or infinite impulse response (IIR) digital filters are not flexible solutions. Methods proposed to exploit the sparsity of the echo and NEXT impulse responses are also not trivial as accurate channel estimates are needed before those significant taps with large magnitude can be identified. The problem becomes even worse by introducing Tomlinson-Harashima precoding (TH precoding) in 10GBase-T as the inputs to echo and NEXT cancellers are no longer simple PAM-M symbols but numbers uniformly distributed on $[-M, M)$. Hence, the wordlength of the inputs for echo and NEXT cancellers could be as long as 10 bits, which further increases the complexity and cost of echo and NEXT cancellers (See, e.g., G. Zimmerman, "Downside of TH Precoding", 10GBase-T Study Group Meeting, http://www.ieee802.org/3/an/public/may04/zimmerman_1_0504.pdf, May, 2004).

What is needed is a method for designing efficient echo and NEXT cancellers that achieve minimal power consumption and area costs by reducing word-length requirements.

BRIEF SUMMARY OF THE INVENTION

The present invention provides an efficient implementation of echo and NEXT cancellers by wordlength reduction technique and describes a method for designing low complexity and low power echo and NEXT cancellers for 10GBase-T.

In accordance with the present invention, wordlength reduction technique is proposed for low complexity and low power design. A TH precoder is first converted to its equivalent form where the TH precoder can be viewed as an infinite impulse response (IIR) filter with an input equal to the sum of the original input to the TH precoder and a finite-level compensation signal. Instead of using the output of the TH precoders as the input to the echo and NEXT cancellers, the sum of the original input to the precoder and the compensation signal is viewed as the input of the echo and NEXT cancellers. Then a data encoding technique can be used to reduce the wordlength of the input of the echo and NEXT cancellers resulting in low complexity and low power design since the number of possible values of the sum of the original input to the precoder and the compensation signal is finite. Finally, by removing the implicit IIR filter with poles near the unit circle from the adaptive loop of these cancellers, the convergence speed of the adaptation is greatly improved. In addition, an improved design by exploiting the statistics of the compensation signal is also proposed to further bring down the complexity and power consumption of these cancellers.

Further embodiments, features, and advantages of the present invention, as well as the structure and operation of the various embodiments of the present invention are described in detail below with reference to accompanying drawings.

BRIEF DESCRIPTION OF THE DRAWINGS/FIGURES

The present invention is described with reference to the accompanying figures. The accompanying figures, which are incorporated herein and form part of the specification, illustrate the present invention and, together with the description, further serve to explain the principles of the invention and to enable a person skilled in the relevant art to make and use the invention.

Table 1 lists an encoding mapping from the sum of original input to the TH precoder and the corresponding compensation signal to its 8 bits 2's complement.

Table 2 lists an encoding mapping from the original transmitted symbol without TH precoder to its 2's complement representation in 4 bits.

Table 3 lists an encoding mapping from the compensation signal to its 4 bits binary representation.

DETAILED DESCRIPTION OF THE INVENTION

Background on Echo and NEXT Cancellers in 10Gbase-T

Recently, TH precoding has been proposed to be used in 10GBase-T because it can eliminate error propagation and allow use of capacity-achieving channel codes, such as low-density parity-check (LDPC) codes, in a natural way. However, the use of TH precoding significantly increases the complexity of echo and NEXT cancellers in 10GBase-T.

Figure 1:
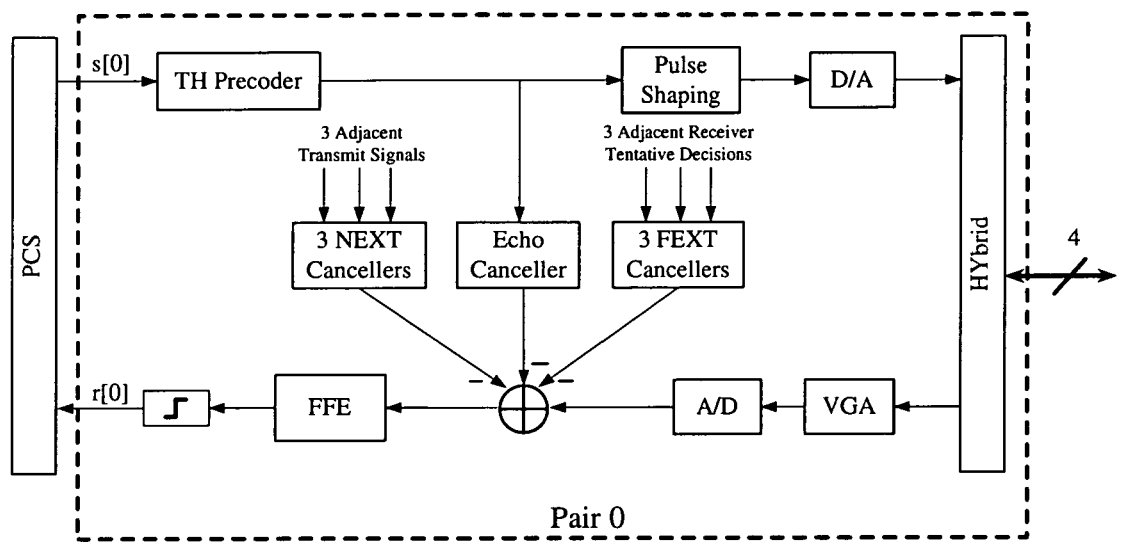
FIG. 1 illustrates the block diagram of a typical transceiver in 10GBase-T for one pair out of four pairs of cables in an unshielded twisted pair (UTP) cable.
Figure 2:
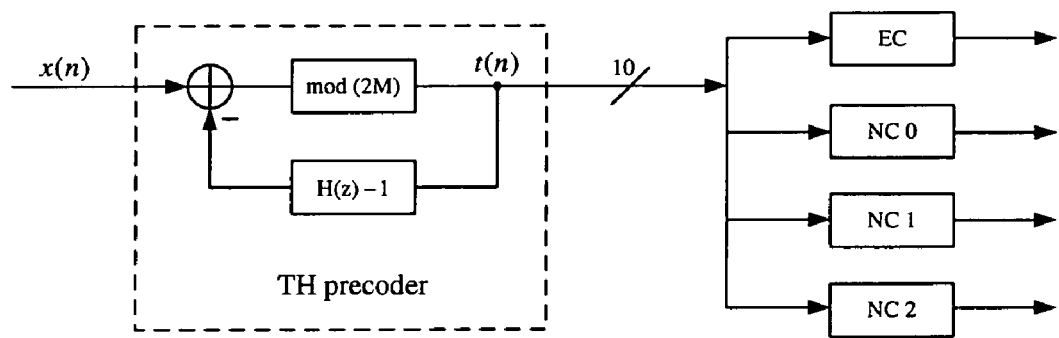
FIG. 2 illustrates the traditional echo and NEXT cancellers with inputs from the output of the TH precoder.

Consider the block diagram of the typical 10GBase-T transceiver for one pair in FIG. 1, where we need to implement one echo and three NEXT cancellers for each of four channels (or four pairs). These cancellers can be implemented based on adaptive FIR filters. In a straightforward design, the inputs of these echo and NEXT cancellers come from the output signal of the Tomlinson-Harashima precoder (TH precoder) associated with the same pair, i.e., the signal t(n) is used as the input to these cancellers, as shown in FIG. 2, where EC denotes echo canceller and NC denotes NEXT canceller. The problem associated with the design in FIG. 2 is that the wordlength of the signal, t(n), could be as long as 10 bits due to the use of TH precoding. While without TH precoding, x(n), a PAM-16 (16-level pulse amplitude modulation) signal of length only 4 bits, is used as the input signal to these cancellers. Therefore, word-length increase due to the precoding in 10GBase-T significantly increases the complexity of the multipliers in echo and NEXT cancellers. Since these cancellers are the largest blocks in the DSP transceiver, it is important to develop techniques to design echo & NEXT cancellers with low complexity and low power.

A Method to Design Low Power Echo and NEXT Cancellers

It is known that the hardware complexity and power consumption of the filter are influenced by many factors such as the number of taps used, the coefficient range of the taps, and the operating speed. In this invention, we propose to reduce the wordlength of the input signal for echo & NEXT cancellers to achieve the low complexity and low power design.

Figure 3:
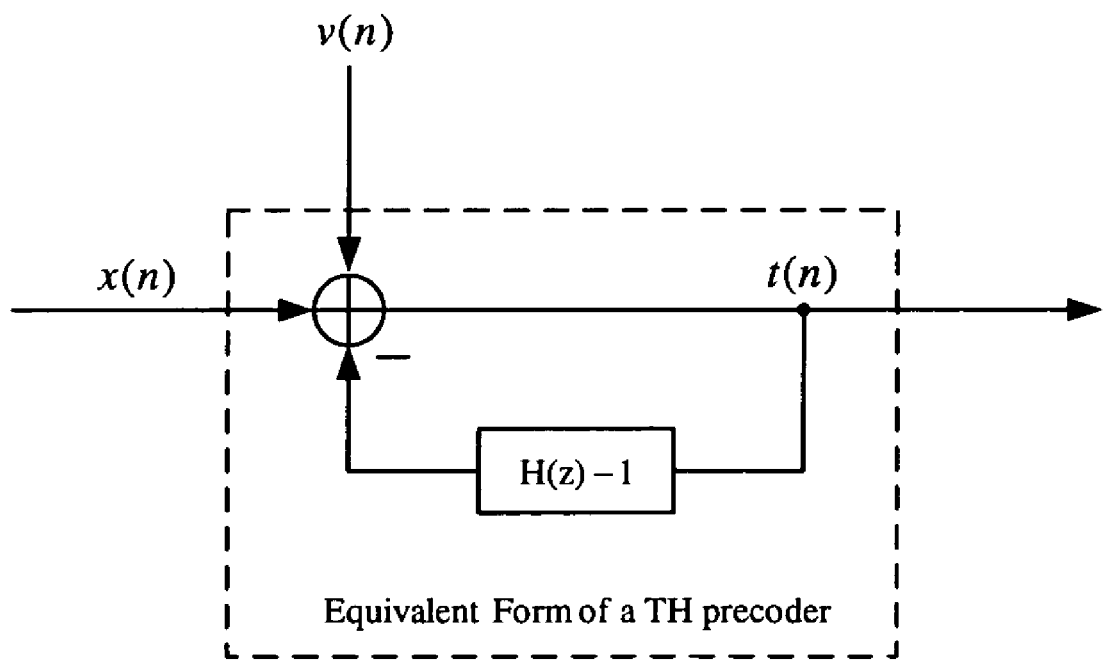
FIG. 3 illustrates the equivalent form of a TH precoder.

Consider an equivalent form of the TH precoder in FIG. 3. A unique compensation signal v(n), which is a multiple of 2M, is added to the transmitted PAM-M signal x(n) such that the output of the precoder t(n) lies in the interval [−M, M). If the input of the TH precoder, x(n), is i.i.d, it can be shown that t(n) has uniform distribution over [−M, M). The effective transmitted data sequence in z-domain is given by $$T(z) = \frac{X(z) + V(z)}{H(z)}. \quad \text{EQ. (1)}$$

where H(z) is a causal FIR in the TH precoder feedback path.

Figure 4:
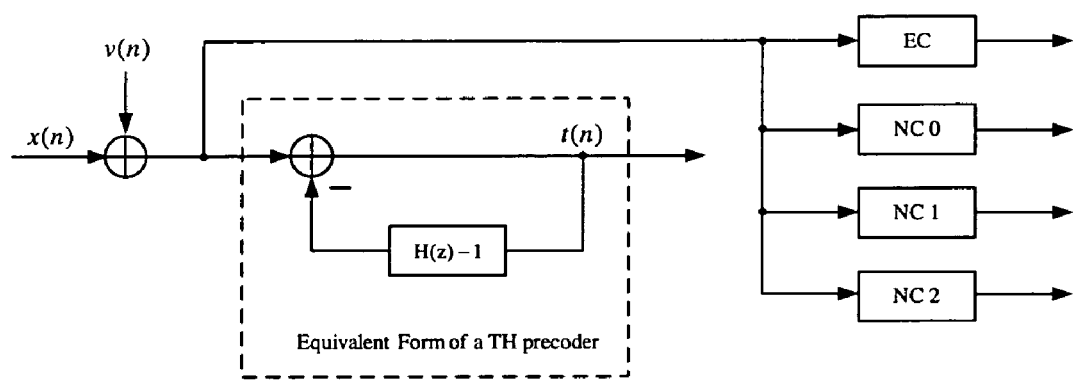
FIG. 4 illustrates the idea of the proposed method.

From EQ. (1), we see that a TH precoder can be viewed as an IIR filter with the input equal to the original TH precoder and a finite level compensation signal, i.e., x(n)+v(n). For M=16, the input x(n) is a PAM-16 signal with symbol set {±1, ±3, ..., ±15} and can be encoded as a binary representation using 4 bits. The number of levels of the compensation signal, v(n), is dependent on the coefficients of the precoder. Based on the precoder coefficients for the worst case (long cables) (See, e.g., IEEE 803.2an Draft Standard 2.0, 2004), it is found that v(n) has at most 13 possible levels from the set {0, ±32, ..., ±192}. Thus, v(n) also can be represented with a binary representation using 4 bits. Hence, the sum of these two signals, x(n)+v(n), will have at most $16^2$ possible values, which can be represented with an 8-bit binary number. Based on this key observation, the signal x(n)+v(n) is proposed to be used as the input to the echo and NEXT cancellers instead of using the TH precoder output, t(n), as shown in FIG. 4. The advantage is that the wordlength of the input signal to these cancellers is reduced from 10 bits to 8 bits. If the number of taps and the coefficient wordlength of these cancellers in the straightforward method and the proposed method are the same, then the proposed design will achieve lower complexity and lower power.

Note that the 8-bit encoded sum signal x(n)+v(n) loses the actual value of the sum x(n)+v(n), and it only represents one of the 256 possible values. Therefore directly applying the 8-bit sum signal to the input of the echo and NEXT cancellers is not valid. One method to slove this problem is using pre-computation technique since this sum signal is a finite integer number (See, Keshab K. Parhi, "Pipelining of Parallel Multiplexer Loops and Decision Feedback Equalizers", in *Proc. ICASSP* 2004, vol. 5, pp. 21-24, May 2004). However, the hardware overhead associated with the precomputation technique is huge; especially when the number of filter taps is large, the hardware overhead exponentially increases. In this invention, we propose a method to encode the input data $x(n)+v(n)$ before applying it to the echo and NEXT cancellers. The desired output of the overall FIR filter is obtained by using a corresponding decoding process. Thus, the idea in FIG. 4 can be implemented with reduced input wordlength.

Table 1 gives the proposed encoding mapping between the real value of $x(n)+v(n)$ and its 2's complement encoded bits. Suppose the value of $x(n)+v(n)$ is $d(n)$, and the value of the corresponding encoded bits is $w(n)$. It can be seen from the table $$d(n)=2\times w(n)+1, \qquad \text{EQ. (2)}$$

i.e., $$w(n)=2^{-1}\times[d(n)-1], \qquad \text{EQ. (3)}$$

Figure 5:
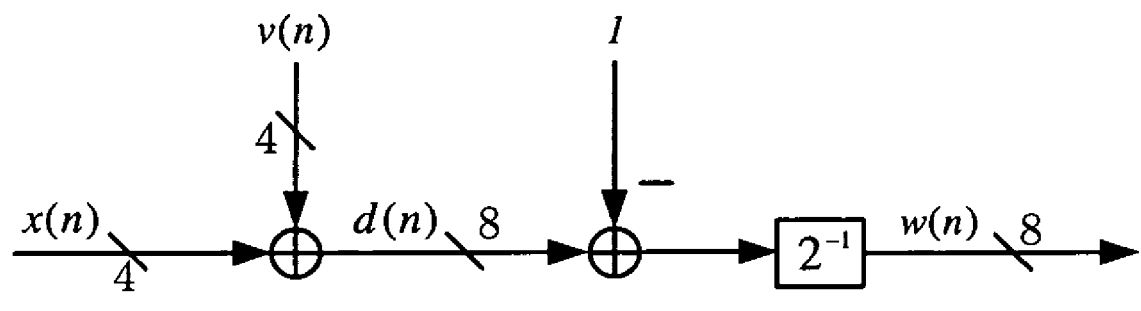
FIG. 5 illustrates an encoding circuit.

EQ. (3) can be viewed as the encoding equation, which can be easily implemented with one shifter and one adder as shown in FIG. 5. The 8-bit encoded data is then applied to the input of the echo and NEXT cancellers to compute the replica of the echo and NEXT interferences. As we pointed before, the output of these cancellers is not right unless a corresponding decoding operation is used.

Consider an N-th order FIR filter with output $$y(n) = \sum_{k=0}^{N} g(k)d(n-k), \qquad \text{EQ. (4)}$$

where $g(k)$ is the tap coefficient, and $d(n-k)$ is the input data with time index $n-k$ without encoding, i.e., the actual value of $x(n)+v(n)$. Substitute EQ. (2) into EQ. (4), we get $$y(n) = \sum_{k=0}^{N} g(k)(2w(n-k)+1) \qquad \text{EQ. (5)}$$

$$= 2\sum_{k=0}^{N} g(k)w(n-k) + \sum_{k=0}^{N} g(k). \qquad \text{EQ. (6)}$$

Figure 6:
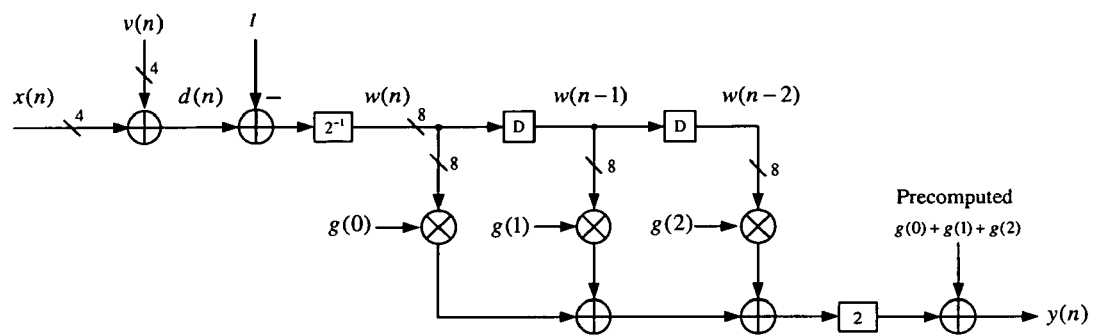
FIG. 6 illustrates an architecture of a 3-tap FIR implementation with wordlength reduction.

The first sum on the right side of the equation is the exact filter output with 8-bit encoded data as inputs, and the second term is the sum of all the coefficients of the filter, which can be pre-computed. Hence, the desired output of the original FIR filter can be easily obtained from EQ. (6). As an example, the overall architecture for a 3-tap FIR filter implementation with wordlength reduction technique is shown in FIG. 6.

Figure 7:
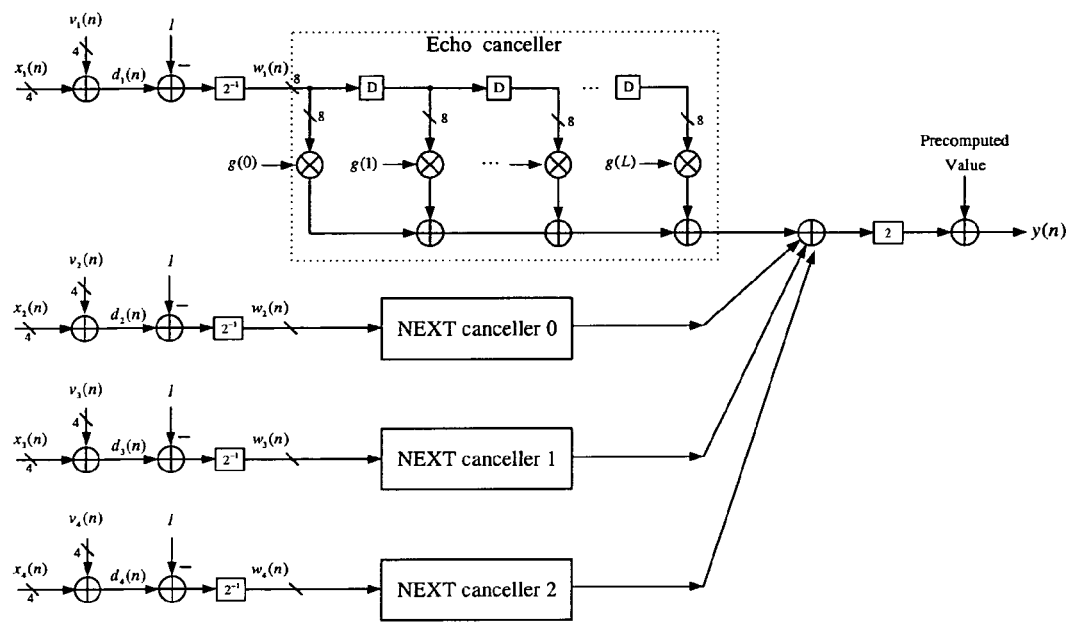
FIG. 7 illustrates the proposed architecture for echo and NEXT cancellers.

It is easy to extend this design to the application in 10GBase-T, where one echo and three NEXT cancellers are needed for each receiver. FIG. 7 shows the proposed architecture of echo and NEXT cancellers for one pair. Before feeding into the cancellers, the sum signals of the input signals of the four TH precoders and corresponding compensation signals are first encoded into 8-bit binary numbers in the form of 2's complement. After adding the four outputs of these cancellers, the real output is recovered by a shifter and an adder. It can be seen that the hardware overhead is only five shifters and five adders.

Figure 8:
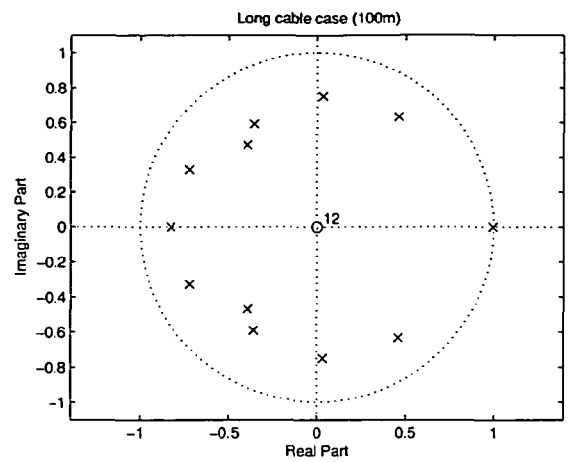
FIG. 8 illustrates the poles of the Tomlinson-Harashima precoder for different cases.
Figure 8:
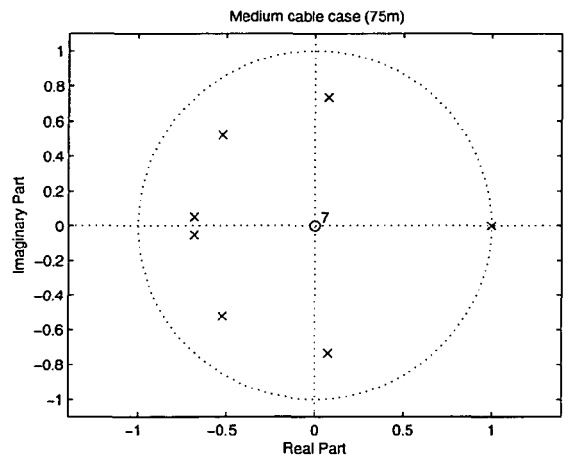
Figure 8:
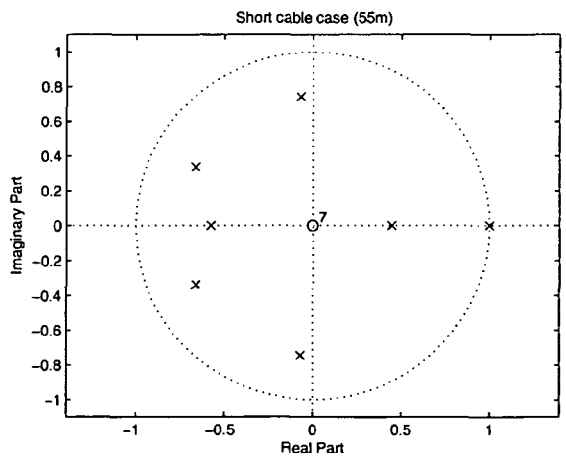

However, the problem with having $x(k)+v(k)$ as input to the cancellers in FIG. 4 is that the convergence speed of these cancellers during adaptation is very slow since these cancellers implicitly contain an IIR filter in the loop. The adaptive operation speed is controlled by the poles of maximum magnitude of these IIR filters have a pole at 0.996 (based on the precoder coefficients for long cables) which is very close to the unit circle, as shown in FIG. 8.

Figure 9:
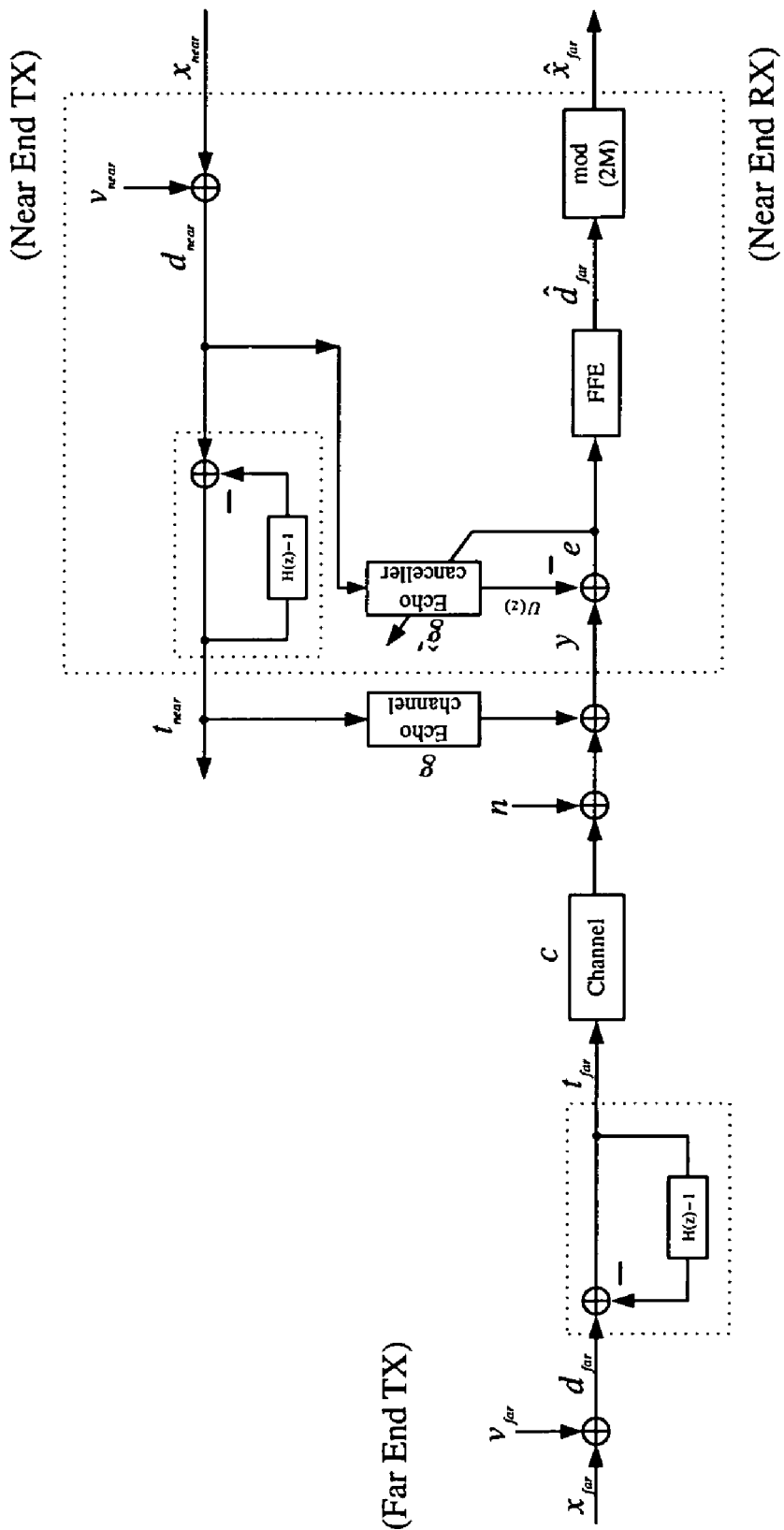
FIG. 9 illustrates a simple case with the received signal only corrupted by echo noise.

To solve this problem, consider FIG. 9, a simple case where the received signal y at one pair is only corrupted by echo noise and the near end sum signal $x_{near}(k)+v_{near}(k)$ is used as the input of the canceller. Let $t_{far}$ denote the transmitted symbol sequence from the far end transmitter and $t_{near}$ denote the transmitted symbol sequence from the near end transmitter, and n denote the background noise at the channel output. Then the channel received symbol sequence is given by $$y=c\otimes t_{far}+g\otimes t_{near}+n \qquad \text{EQ. (7)}$$

where $\otimes$ represents convolution. Here c denotes channel impulse response and g denotes echo channel impulse response. Writing EQ. (7) in Z domain, we get $$Y(z)=C(z)T_{far}(z)+G(z)T_{near}(z)+N(z). \qquad \text{EQ. (8)}$$

Similarly, we represent the output of the corresponding echo cancellers as $$U(z)=\hat{G}'(z)D_{near}(z) \qquad \text{EQ. (9)}$$

where $D_{near}(z)=X_{near}(z)+V_{near}(z)$, and $\hat{G}'(z)$ is the Z-transform of echo canceller impulse response. Then ideal cancellation is achieved when $$\hat{G}'(z)D_{near}(z)=G(z)T_{near}(z) \qquad \text{EQ. (10)}$$

From EQ. (1), EQ. (10) can be written as $$\hat{G}'(z)D_{near}(z) = \frac{G(z)D_{near}(z)}{H(z)} \qquad \text{EQ. (11)}$$

$$\hat{G}'(z) = \frac{G(z)}{H(z)} \qquad \text{EQ. (12)}$$

From EQ. (12), we see that the canceller to be designed implicitly contains an IIR filter. In a straightforward way, an FIR filter is chosen to approximate this IIR filter due to its good stability and ease of implementation. However, the length of FIR chosen could be very long when the poles of the IIR filter are close to unit circle in the z-plane. In this case, the benefit from wordlength reduction technique will be countered due to the increased taps of the FIR filter and the convergence speed during the adaptation will also be slow. On the other hand, system performance may degrade since FIR filter is only an approximation of the IIR filter. Another approach is to use an adaptive IIR filter, which is more complex to analyze and suffers from stability problem. We solve this problem by removing the implicit IIR filter from the cancellation path resulting in a solution which does not suffer from stability problem or slow convergence speed.

Figure 10:
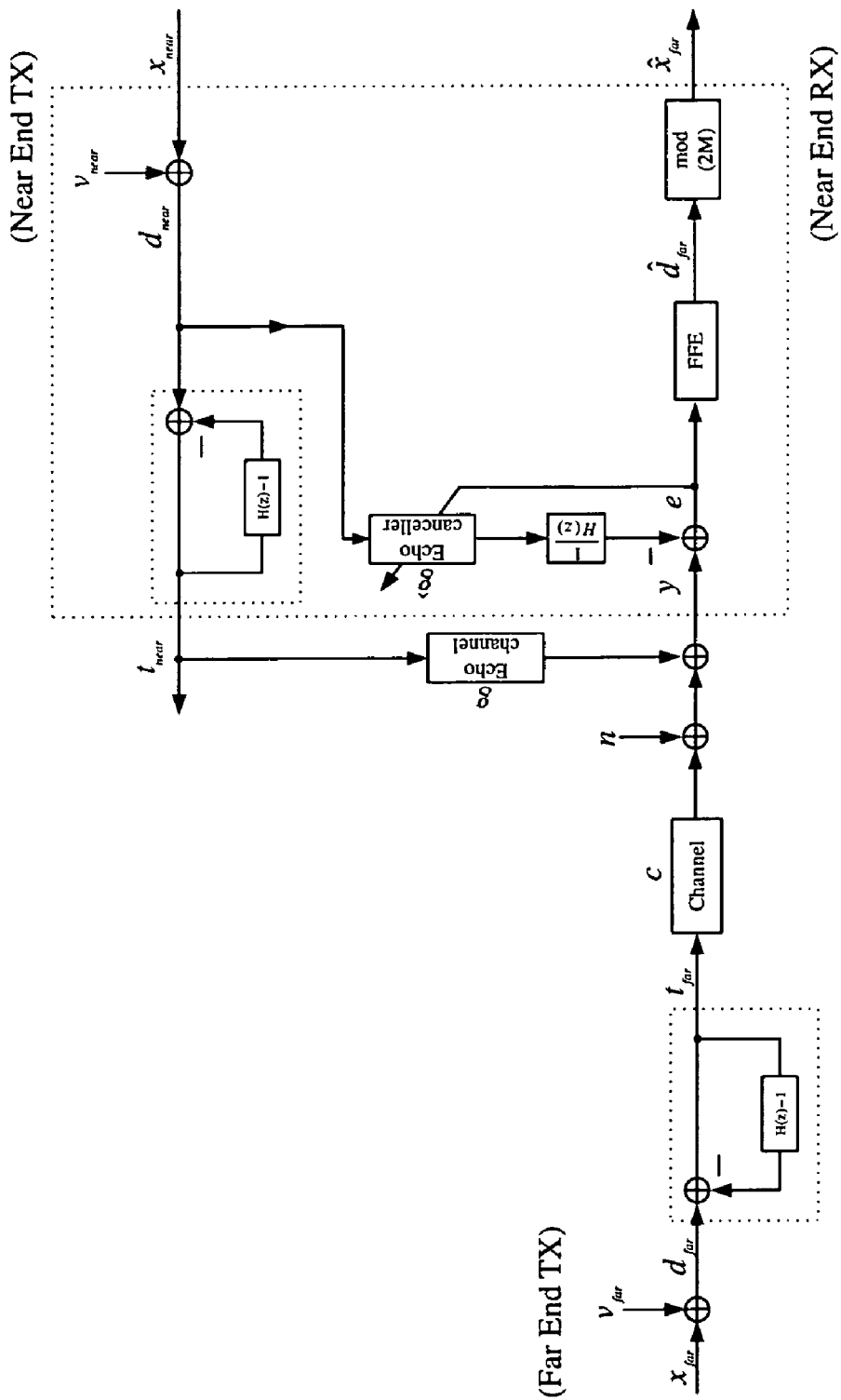
FIG. 10 illustrates a modified design for FIG. 9.

Consider FIG. 9 again, if we introduce $1/H(z)$ with fixed coefficients into the echo cancelling path after FIR echo canceller as shown in FIG. 10, EQ. (12) will be $$\frac{\hat{G}(z)}{H(z)} = \frac{G(z)}{H(z)} \qquad \text{EQ. (13)}$$

where $\hat{G}(z)$ is the Z-transform of the echo & NEXT channel estimate. As we can see the implicit IIR filter in the echo canceller is balanced by inserting $1/H(z)$; thus echo noise can be cancelled better. Since the echo cancellation is in adaptive sense, introducing an IIR filter in the adaptation loop will greatly affect the convergence speed although this might bring better performance than the design in FIG. 9. Can we remove the IIR filter from the echo cancelling path while still getting better performance?

Figure 11:
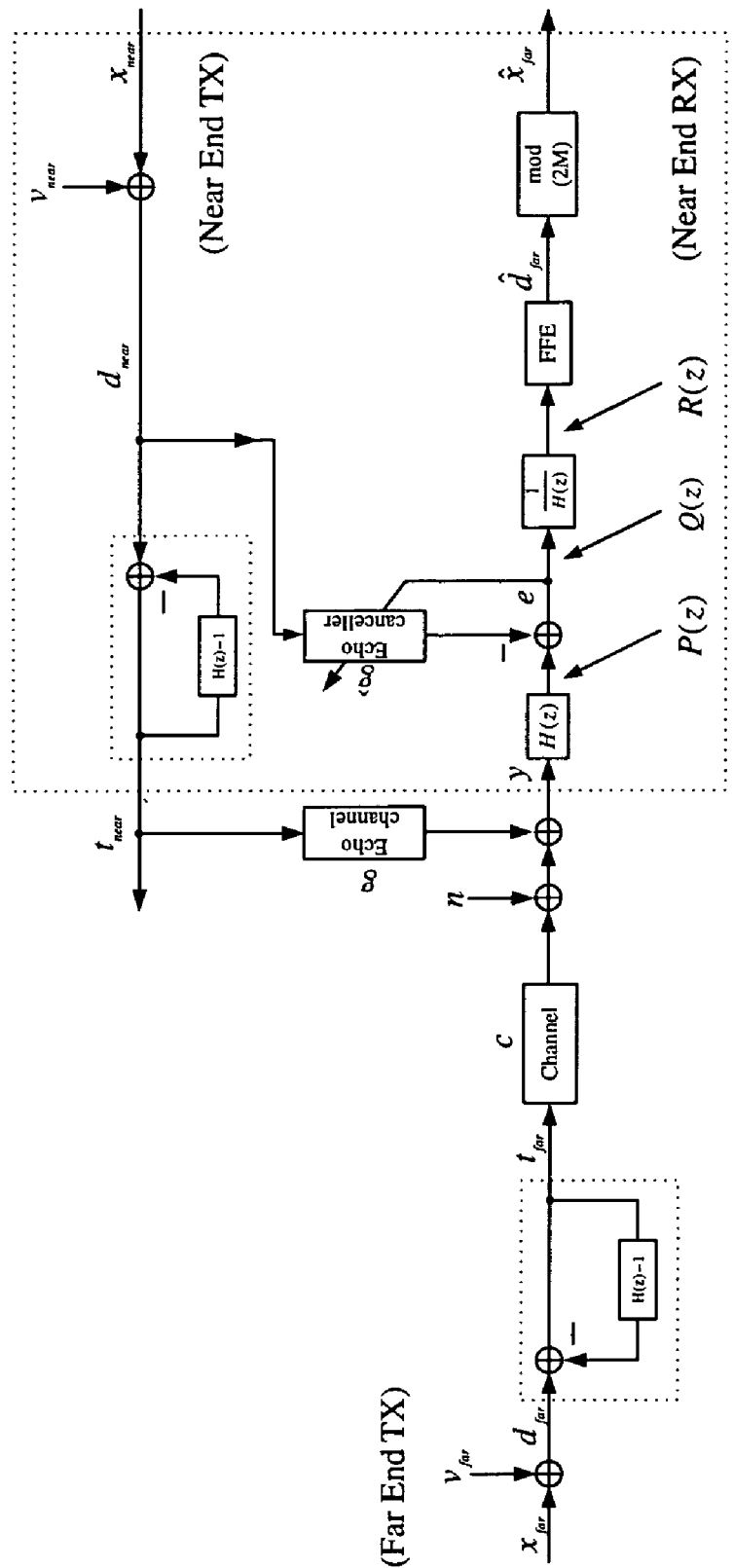
FIG. 11 illustrates the proposed design without suffering stability problem and slow convergence.

FIG. 11 illustrates the proposed design. The IIR filter 1/H(z) is removed from the echo cancelling path. However, an FIR H(z) is added to the signal receiving path before echo cancellation. Here note that the coefficients of FIR filter H(z) are set using the coefficients of THP precoder. To compensate the effect of the FIR H(z) on received signal, the filter 1/H(z) is added after the noise cancellation. Consider the output of the introduced FIR H(z) in FIG. 11, we get $$P(z) = [C(z)T_{far}(z) + G(z)T_{near}(z) + N(z)]H(z) \quad \text{EQ. (14)}$$

$$= C(z)T_{far}(z)H(z) + G(z)D_{near}(z) + N(z)H(z). \quad \text{EQ. (15)}$$

Figure 12:
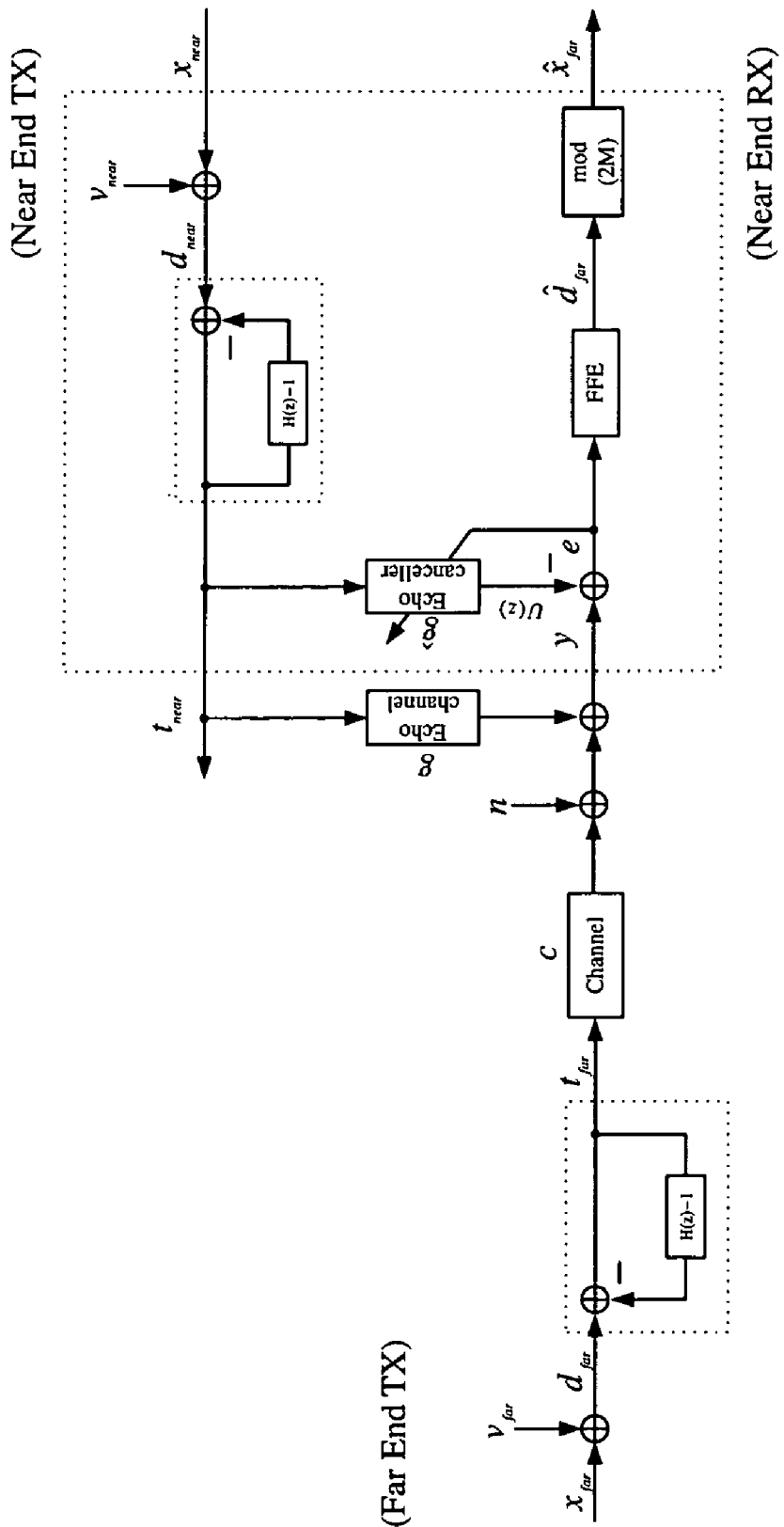
FIG. 12 illustrates the traditional design corresponding to FIG. 11.

Observing the second term at right side in EQ. (15), the IIR filter shown in EQ. (11) disappears here and echo noise cancellers based on FIR structure can be used to approximate the echo channel in a natural way. EQ. (15) also shows that the received signal has a multiplication distortion by H(z); however, this can be countered by multiplying 1/H(z) after echo cancellation. Assuming perfect cancellation, the residual signal can be written as $$Q(z) = C(z)T_{far}(z)H(z) + N(z)H(z) \quad \text{EQ. (16)}$$

and the input of the FFE is $$R(z) = \frac{Q(z)}{H(z)} = C(z)T_{far}(z) + N(z) \quad \text{EQ. (17)}$$

which is the same as the input of the FFE for original cancellers with input from the output of the precoder in FIG. 12. Thus, the design in FIG. 11 is simple and effective for echo noise cancellation and it also does not affect the received signal. Since the IIR filter is removed, now it is a simple adaptive FIR structure which does not suffer from stability problem and slow convergence during the adaptation any more. Based on the idea in FIG. 11, it is easy to extend this to design of the cancellers in 10GBase-T.

An Improved Design to Further Bring Down the Power Consumption

Figure 13:
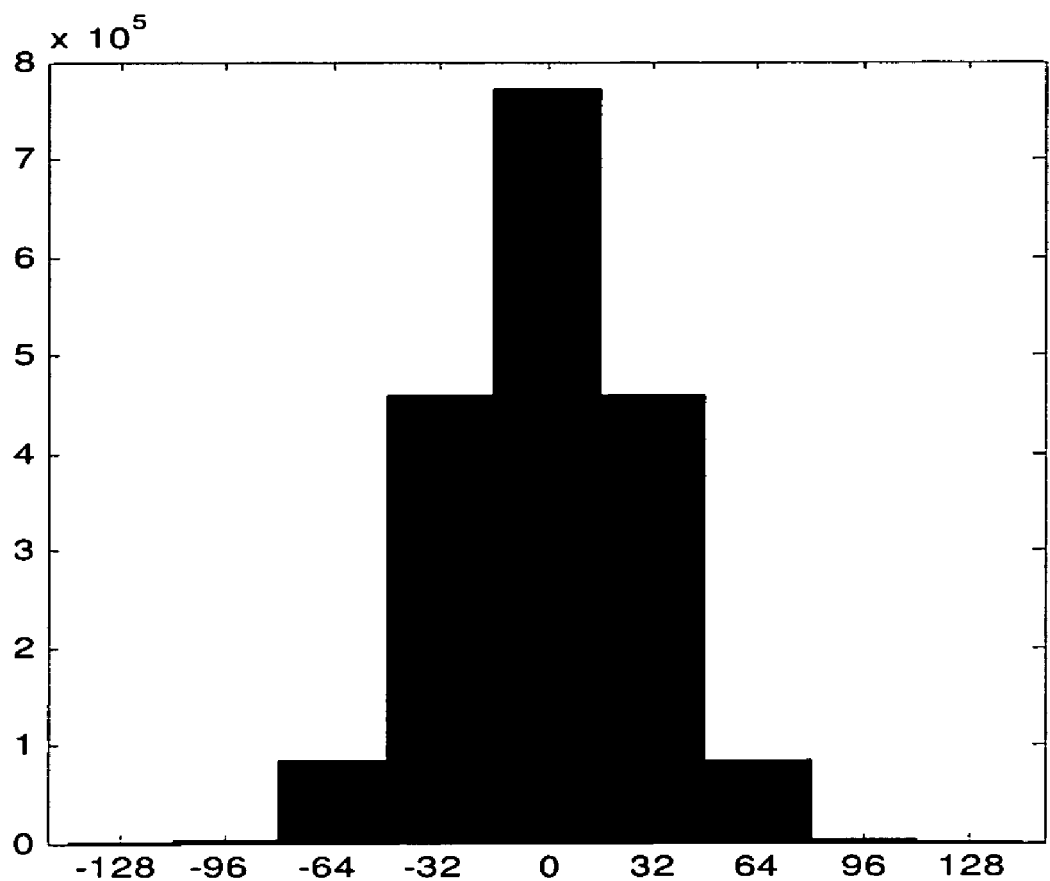
FIG. 13 illustrates the histogram of the compensation signal v(n).

The distribution of the compensation signal v(n) was not only found to be uniform but also symmetric, as shown in FIG. 13, which is based on the precoder coefficients for the worst case (long cables, 100 m). Over a probability of 90%, v(n) takes one of the values from the set {−32, 0, 32}, i.e., most of the time, v(n) can be represented by a 2-bit binary number. Furthermore, v(n) is a multiple of 2M, i.e., 32 in this case and the effective value of the set {−32, 0, 32} is {−1, 0, 1}. This implies that no multiplication is needed when multiplying any number in this set. Therefore, it is possible to further bring down the complexity and power consumption by taking advantage of this property of v(n).

Figure 14:
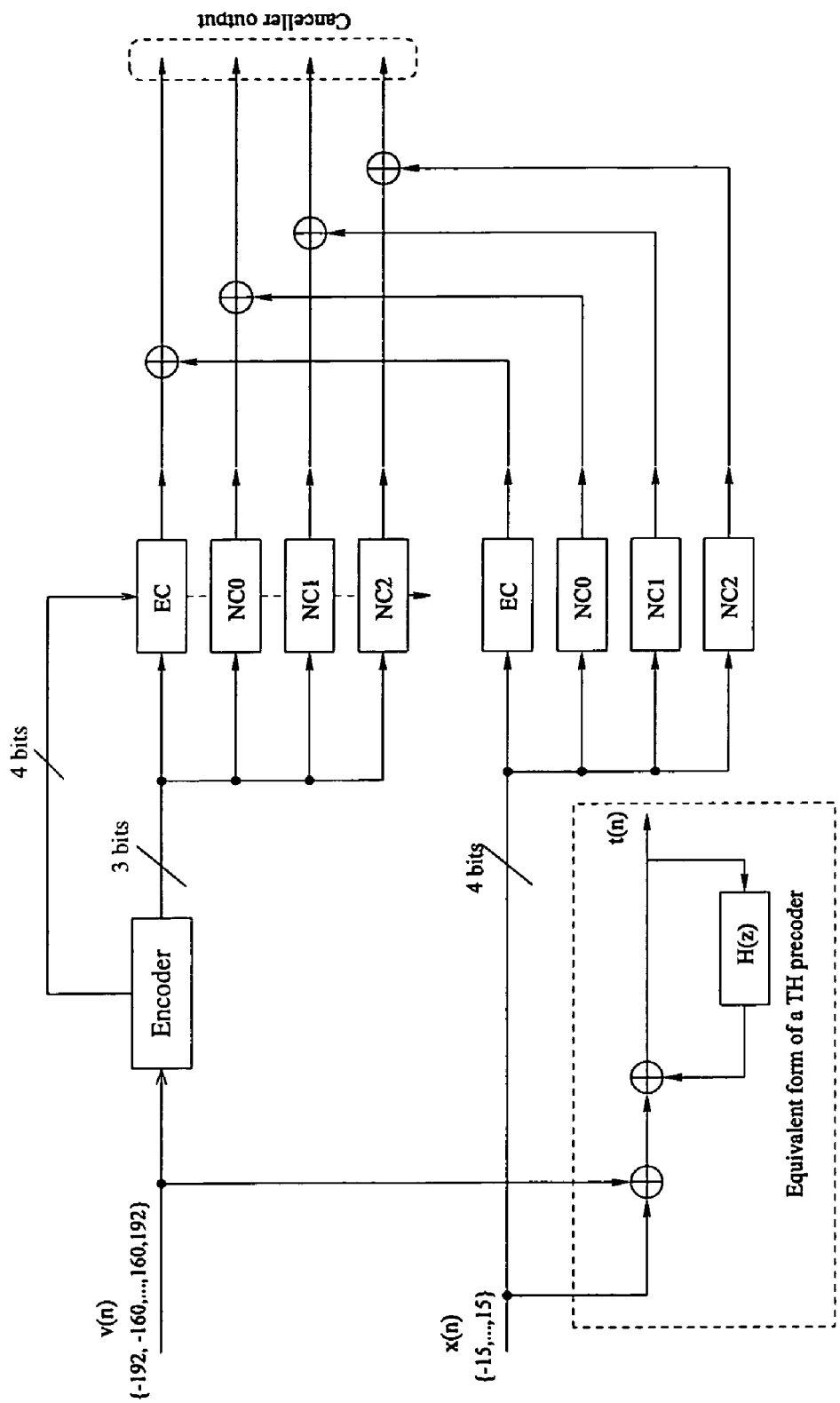
FIG. 14 illustrates the improved design for echo and NEXT cancellers.

In this improved design, we propose to separate v(n) from the sum signal x(n)+v(n), and then the filter with input of x(n)+v(n) can be implemented as two filters, one with input x(n) and another with input v(n), as shown in FIG. 14. The sum of the outputs of these two filters is the same as the output of the original filter. The input x(n) is a PAM-16 signal and takes value from symbol set {±1, ±3, ..., ±15} independently with equal probability for each element in the set. The filter with input x(n) can be implemented using the idea shown in FIG. 6 and the input signal x(n) is encoded as 4 bits as shown in Table 2. For the filter with input v(n), a symbol detection circuit is designed to generate control signals for this high probability set {−1, 0, 1}. For the other possible values in the set {±2, ±3, ..., ±6}, v(n) is encoded into its 2's complement representation, i.e., 4 bits. The multipliers in these cancellers are configured as a 4-bit multiplier depending on the level of the amplitude detector signal. The advantage is that a 4 bit input multiplier for x(n) and a configurable 4-bit input multiplier for v(n) are used instead of an 8 bit multiplier as shown in FIG. 7. Considering the symmetry of this symbol set, 3 bits are enough to represent all the numbers. The multipliers in the echo & NEXT cancellers with v(n) input can be configured as 3-bit multipliers or 0-bit multipliers (i.e., without multiplication operations). These facts are exploited to further reduce the complexity and power consumption.

Figure 15:
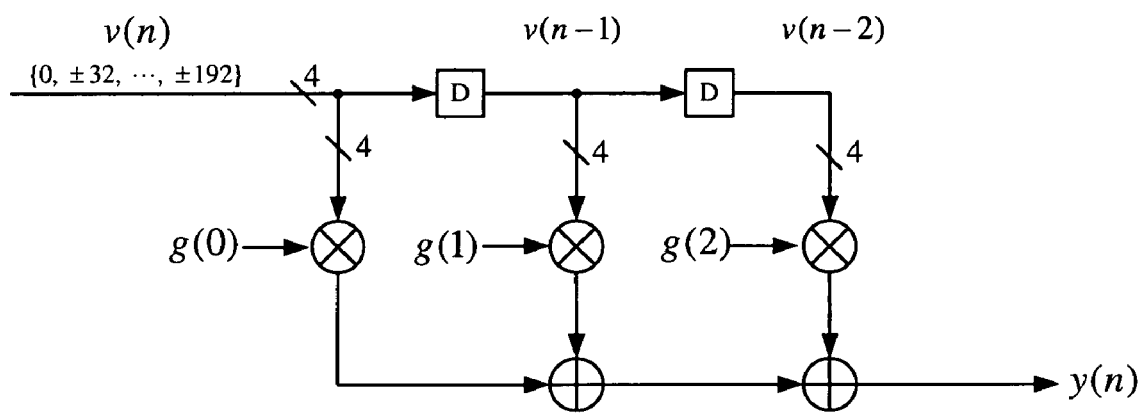
FIG. 15 illustrates a 3-tap FIR with input v(n).

Consider a 2-nd order FIR filter with input v(n) in FIG. 15. Since v(n) takes value from the set {0, ±32, ..., ±192}, neglecting the multiple 32, the effective symbol set is {0, ±1, ..., ±6} and the encoded bits are shown in Table 3. One straightforward way to implement this filter is using precomputation technique since v(n) has only 13 finite values. As mentioned before, this method suffers from huge hardware overhead although it may eliminate all multiplication operations. For example, in this case, a total of $13^3$ values need to be stored beforehand and a 2197-to-1 multiplexer would also need. A modified precomputation method is to only precompute the values for each tap instead of precomputing all the values of the final output. For example, in this case, only 13 values are needed to be precomputed and a 13-to-1 multiplexer is needed for each tap. Totally, 39 values are precomputed and three 13-to-1 multiplexers are needed. However, for most of the time v(n) takes value from {−1, 0, 1}, thus precomputation of all the 13 values for each tap is not necessary. Also note that if the filter is in adaptive mode, all these precomputed values have to be updated each time, which will consume lots of power. Therefore, a new method is needed to fully exploit the property of v(n) to achieve a low power design.

Figure 16:
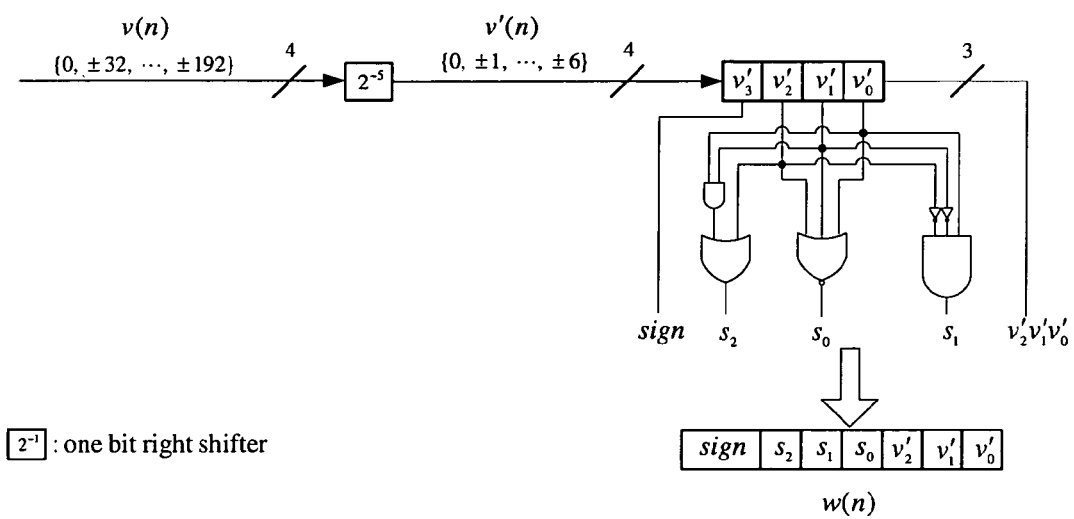
FIG. 16 illustrates an encoding circuit for v(n).

Since the v(n) is symmetric, we only consider the positive numbers, which is represented in unsigned 3 bits. A symbol detection circuit is designed to generate the control signals for the set {0, 1}. In FIG. 16, $s_0$ is used for indicating the current symbol is 0; $s_1$ indicates the current symbol is 1; and $s_2$ indicates the current symbol is in the set {±2, ±3, ..., ±6}. The generated control signals, together with the sign bit signal, are appended after 3-bit input v(n).

Figure 17:
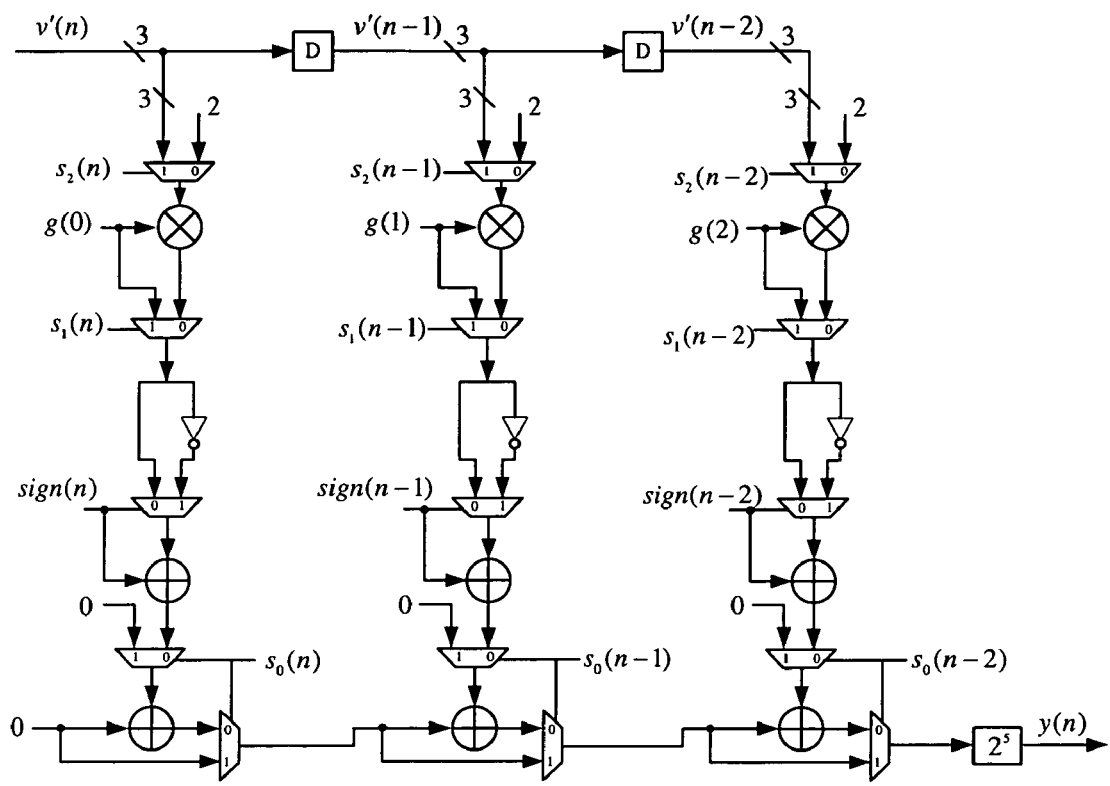
FIG. 17 illustrates the proposed low power design for a 3-tap FIR filter.

As an example, FIG. 17 shows the new design for a 2-nd order FIR filter with input v(n). For each tap, the input of the multiplier is set as 2 unless the current input of the filter v(n) is from set {±2, ±3, ..., ±6}. This ensures the status of the multiplier at each tap is unchanged for most of the time and the probability of switching is reduced. If the current input is 1, then the tap coefficient is selected as the result of the multiplication without switching in the multipliers. A conversion circuit is also used to convert the intermediate result into 2's complement form. If 0 occurs, no operation is needed in the current tap and the data is simply passed to the next tap. In this design, we see that significant power is saved on multipliers by reducing the probability of switching on the multipliers, since over 90% time, the status of the multipliers is unchanged. One thing to mention is that the critical path is increased by $7T_{mux}+T_a$. Generally, for an n-th order FIR, the increased critial path will be $(5+n-1)T_{mux}+T_a$. Where $T_{mux}$ is the computation time of a multiplexer, and $T_a$ is the computation time of an adder. However, this will not be a big issue because pipelining techniques can be used to reduce the critical path.

CONCLUSIONS

A method to design low complexity and low power echo and NEXT cancellers based on wordlength reduction techniques is presented. The resulting new echo and NEXT cancellers can be used for high-speed communication applications, such as 10 Gigabit Ethernet over copper.

While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

TABLE 1

| x(n) + v(n) | Encoded bits | x(n) + v(n) | Encoded bits |
|---|---|---|---|
| 15 + 192 | 01100111 | 15 − 192 | 10100111 |
| 13 + 192 | 01100110 | 13 − 192 | 10100110 |
| 11 + 192 | 01100101 | 11 − 192 | 10100101 |
| 9 + 192 | 01100100 | 9 − 192 | 10100100 |
| 7 + 192 | 01100011 | 7 − 192 | 10100011 |
| 5 + 192 | 01100010 | 5 − 192 | 10100010 |
| 3 + 192 | 01100001 | 3 − 192 | 10100001 |
| 1 + 192 | 01100000 | 1 − 192 | 10100000 |
| −1 + 192 | 01011111 | −1 − 192 | 10011111 |
| −3 + 192 | 01011110 | −3 − 192 | 10011110 |
| −5 + 192 | 01011101 | −5 − 192 | 10011101 |
| −7 + 192 | 01011100 | −7 − 192 | 10011100 |
| −9 + 192 | 01011011 | −9 − 192 | 10011011 |
| −11 + 192 | 01011010 | −11 − 192 | 10011010 |
| −13 + 192 | 01011001 | −13 − 192 | 10011001 |
| −15 + 192 | 01011000 | −15 − 192 | 10011000 |
| . | . | −/− | −/− |
| . | . | | |
| . | . | | |

TABLE 2

| x(n) | Encoded bits |
|---|---|
| 15 | 0111 |
| 13 | 0110 |
| 11 | 0101 |
| 9 | 0100 |
| 7 | 0011 |
| 5 | 0010 |
| 3 | 0001 |
| 1 | 0000 |
| −1 | 1111 |
| −3 | 1110 |
| −5 | 1101 |
| −7 | 1100 |
| −9 | 1011 |
| −11 | 1010 |
| −13 | 1001 |
| −15 | 1000 |

TABLE 3

| v(n) | Effective symbol set | Encoded bits |
|---|---|---|
| 192 | 6 | 0110 |
| 160 | 5 | 0101 |
| 128 | 4 | 0100 |
| 96 | 3 | 0011 |
| 64 | 2 | 0010 |
| 32 | 1 | 0001 |
| 0 | 0 | 0000 |
| −32 | −1 | 1001 |
| −64 | −2 | 1010 |
| −96 | −3 | 1011 |
| −128 | −4 | 1100 |
| −160 | −5 | 1101 |
| −192 | −6 | 1110 |

What is claimed is:

1. An echo canceller in a precoded communication transceiver system, comprising:
   a first finite impulse response (FIR) filter to filter a compensation signal generated by a precoder of a corresponding transmitter;
   a second FIR filter to filter an input signal of the corresponding transmitter; and
   a summer to sum outputs of the first and second FIR filters, wherein the sum is an output of the echo canceller.

2. The echo canceller of claim 1, wherein the precoder includes a Tomlinson-Harashima precoder.

3. The echo canceller of claim 1, configured for an Ethernet over copper transceiver having N transmitters and N receivers, where N is a positive integer.

4. The echo canceller of claim 1, wherein the first and second FIR filters are adapted by an error signal generated by subtracting the echo canceller output from a filtered version of a received signal.

5. A near-end crosstalk (NEXT) canceller in a precoded communication transceiver comprising:
   a first NEXT canceller filter to filter a compensation signal of a precoder of an adjacent transmitter;
   a second NEXT canceller filter to filter an input signal of the adjacent transmitter;
   a summer to sum outputs of the first and second NEXT canceller filters;
   wherein the sum represents an output of the NEXT canceller.

6. The NEXT canceller of claim 5, wherein the precoder includes Tomlinson-Harashima precoder.

7. The NEXT canceller of claim 5, configured for an ethernet over copper transceiver having N transmitters and N receivers, where N is a positive integer greater than 1.

8. The NEXT canceller of claim 5, where the first and second NEXT canceller filters are adapted by an error signal generated as a difference between the NEXT canceller output and a filtered version of a received signal.

9. A communications transceiver comprising:
   N transmitters, where N is a positive integer greater than 1, wherein,
      each transmitter includes a precoder coupled to an input signal xi(n) of the corresponding transmitter, where $1 \leq i \leq N$
      each of the precoders has a transfer function 1/H(z) and is configured to output a compensation signal vi(n), and
      each of the transmitters is configured to transmit a corresponding precoded output signal ti(n); and
   N receivers, each including, a first echo canceller coupled to the input signal xi(n) of a near-end one of the transmitters;

a second echo canceller coupled to the compensation signal vi(n) of the near-end transmitter;

circuitry to sum outputs of the first and second echo cancellers to generate a sum;

circuitry to filter a received signal y(n) by a transfer function H(z) to generate a first filtered signal;

circuitry to compute a first error signal as a difference between the first filtered signal and the sum;

circuitry to filter the first error signal by 1/H(z) to generate a second filtered signal; and a decoder to equalize and decode the second filtered signal.

10. The communications transceiver of claim 9, wherein each precoder includes Tomlinson-Harashima precoders.

11. The communications transceiver of claim 9, wherein each decoder includes a feed-forward equalizer and a modulo device.

12. The communications transceiver of claim 9, wherein the transceiver is configured for Ethernet over copper.

13. The communications transceiver of claim 9, wherein the transfer function H(z) represents a finite impulse response filter.

14. The communications transceiver of claim 9, wherein N=4.

15. The communications transceiver of claim 9, implemented in an integrated circuit.

16. A communications transceiver comprising:

N transmitters, where N is a positive integer greater than 1, wherein, each transmitter includes a precoder coupled to an input signal xi(n) of the corresponding transmitter, where $1 \leq i \leq N$ each of the precoders has a transfer function 1/H(z) and is configured to output a compensation signal vi(n), and each of the transmitters is configured to transmit a corresponding precoded output signal ti(n); and N receivers, each including, a first echo canceller coupled to the input signal xi(n) of a near-end one of the transmitters;

a second echo canceller coupled to the compensation signal vi(n) of an i-th near-end one of the transmitters;

a first near-end crosstalk (NEXT) canceller coupled to an input signal xj(n) of an adjacent near-end one of the transmitters, where j is not equal to i;

a second NEXT canceller coupled to a compensation signal vj(n) of an adjacent near-end one of the transmitters;

circuitry to sum outputs of the first and second echo cancellers and the first and second NEXT cancellers to generate a sum;

circuitry to a filter a received signal y(n) by H(z) to generate a first filtered signal;

circuitry to compute a first error signal as difference between the first filtered signal and the sum;

circuitry to filter the first error signal by 1/H(z) to generate a second filtered signal; and a decoder to equalize and decode the second filtered signal.

17. The communications transceiver of claim 16, wherein each precoder includes a Tomlinson-Harashima precoder.

18. The communications transceiver of claim 16, wherein each decoder includes a feed-forward equalizer and a modulo device.

19. The communications transceiver of claim 16, wherein the transceiver is configured for Ethernet over Copper.

20. The communications transceiver of claim 16, wherein the transfer function H(z) represents a finite impulse response filter.

21. The communications transceiver of claim 16, wherein N=4.

22. The communications transceiver of claim 16, implemented in an integrated circuit.

* * * * *